United States Patent
Kayashima et al.

(10) Patent No.: US 11,229,956 B2
(45) Date of Patent: Jan. 25, 2022

(54) NUMERICAL CONTROL DEVICE, ADDITIVE MANUFACTURING APPARATUS, AND METHOD FOR CONTROLLING ADDITIVE MANUFACTURING APPARATUS

(71) Applicant: Mitsubishi Electric Corporation, Tokyo (JP)

(72) Inventors: Shun Kayashima, Tokyo (JP); Nobuyuki Sumi, Tokyo (JP); Kenji Iriguchi, Tokyo (JP); Seiji Uozumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/273,321

(22) PCT Filed: Oct. 22, 2018

(86) PCT No.: PCT/JP2018/039234
§ 371 (c)(1),
(2) Date: Mar. 4, 2021

(87) PCT Pub. No.: WO2020/084673
PCT Pub. Date: Apr. 30, 2020

(65) Prior Publication Data
US 2021/0245252 A1    Aug. 12, 2021

(51) Int. Cl.
*B33Y 50/02* (2015.01)
*G05B 19/4099* (2006.01)
(Continued)

(52) U.S. Cl.
CPC .............. *B22F 10/85* (2021.01); *B22F 12/50* (2021.01); *B23K 26/342* (2015.10); *B33Y 30/00* (2014.12);
(Continued)

(58) Field of Classification Search
CPC .......... B22F 10/85; B22F 12/50; B33Y 40/00; B33Y 50/02; B33Y 30/00; B23K 26/342;
(Continued)

(56) References Cited

U.S. PATENT DOCUMENTS 10,919,090 B2    2/2021  Feldmann et al.
2016/0375640 A1* 12/2016  Cho ...................... B29C 64/106
                                                            425/141
(Continued)

FOREIGN PATENT DOCUMENTS

CN    107921536 A    4/2018
JP    8-309535 A     11/1996
(Continued)

OTHER PUBLICATIONS

International Search Report and Written Opinion dated Jan. 8, 2019, received for PCT Application PCT/JP2018/039234 Filed on Oct. 22, 2018, 9 pages including English Translation.
(Continued)

*Primary Examiner* — Yuhui R Pan
(74) *Attorney, Agent, or Firm* — Xsensus LLP

(57) ABSTRACT

A numerical control device controls an additive manufacturing apparatus that manufactures a modeled object by irradiating a wire, which is a material fed by a driving force of a rotary motor, which is a driving unit, with a beam, and applying the molten material to a workpiece. The numerical control device includes an error detecting unit that detects an error in the height of the workpiece in the height direction in which the material is deposited. The numerical control device includes a condition adjusting unit, which is an adjustment unit that adjusts the supply amount of the material on the basis of the error.

15 Claims, 9 Drawing Sheets

(51) Int. Cl.
*B22F 10/85* (2021.01)
*B33Y 30/00* (2015.01)
*B33Y 40/00* (2020.01)
*B23K 26/342* (2014.01)
*B22F 12/50* (2021.01)

(52) U.S. Cl.
CPC .............. *B33Y 40/00* (2014.12); *B33Y 50/02* (2014.12); *G05B 19/4099* (2013.01); *G05B 2219/35134* (2013.01); *G05B 2219/49023* (2013.01)

(58) Field of Classification Search
CPC ...... G05B 19/4099; G05B 2219/49023; G05B 2219/35134
See application file for complete search history.

(56) References Cited

U.S. PATENT DOCUMENTS

| | | |
|---|---|---|
| 2017/0186143 A1 | 6/2017 | Ohno et al. |
| 2017/0246705 A1 | 8/2017 | Ribic et al. |
| 2017/0274599 A1 | 9/2017 | Kitamura et al. |
| 2018/0169951 A1 | 6/2018 | Niitani |
| 2018/0207722 A1 | 7/2018 | Feldmann et al. |
| 2019/0030818 A1* | 1/2019 | Herman ................. B33Y 50/02 |
| 2021/0170490 A1 | 6/2021 | Feldmann et al. |

FOREIGN PATENT DOCUMENTS

| | | | |
|---|---|---|---|
| JP | 2006-159234 A | | 6/2006 |
| JP | 2016-137654 A | | 8/2016 |
| JP | 2016137654 A | * | 8/2016 |
| JP | 2017-13288 A | | 1/2017 |
| JP | 2017-35879 A | | 2/2017 |
| JP | 6091652 B2 | | 3/2017 |
| JP | 6231696 B1 | | 11/2017 |
| JP | 2018-103635 A | | 7/2018 |

OTHER PUBLICATIONS

Decision to Grant dated Oct. 29, 2019, received for JP Application 2019-526627, 5 pages including English Translation.
Office Action dated Oct. 11, 2021, in corresponding Chinese patent Application No. 201880098781.9, 7 pages.

* cited by examiner

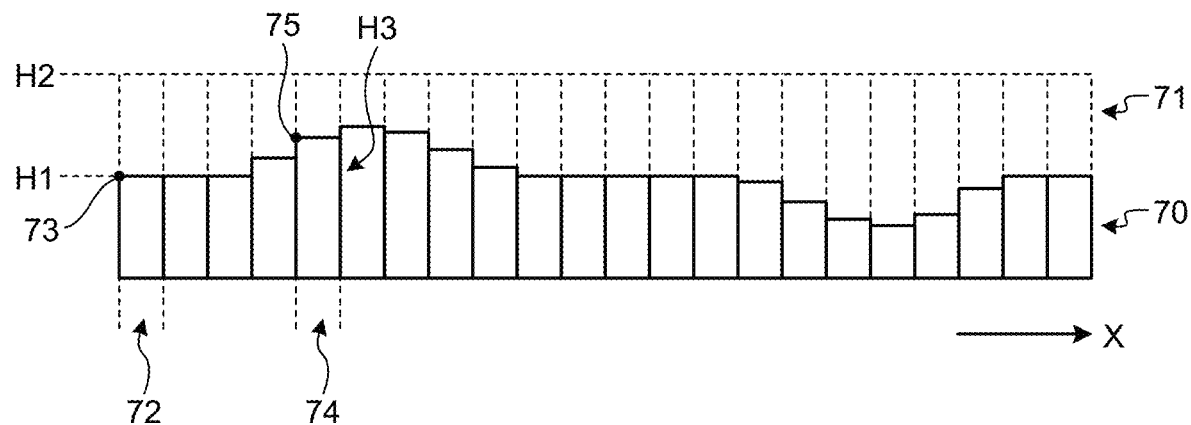
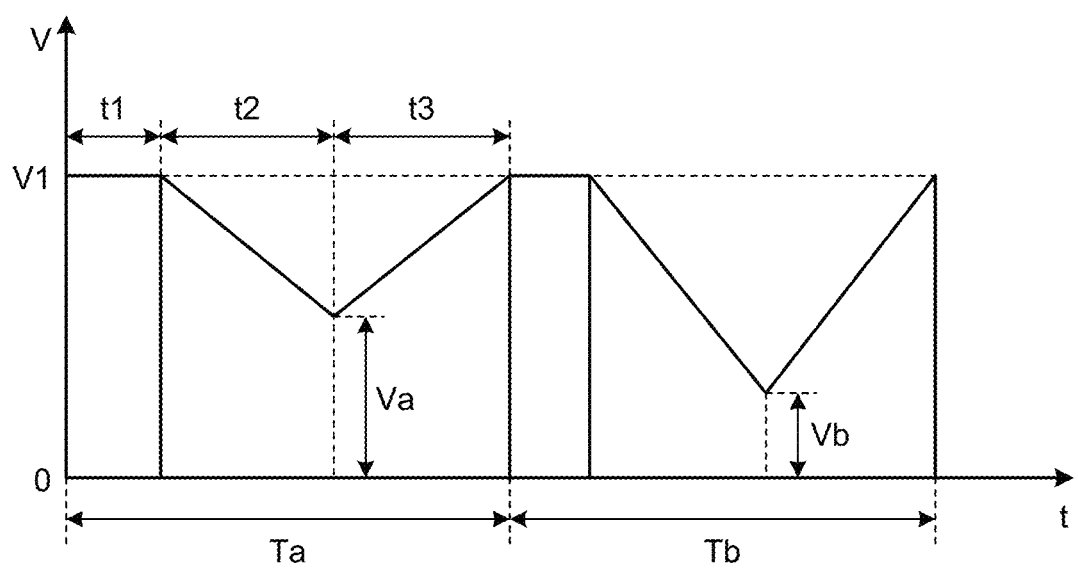

NUMERICAL CONTROL DEVICE, ADDITIVE MANUFACTURING APPARATUS, AND METHOD FOR CONTROLLING ADDITIVE MANUFACTURING APPARATUS

CROSS-REFERENCE TO RELATED APPLICATION

The present application is based on PCT filing PCT/JP2018/039234, filed Oct. 22, 2018, the entire contents of which are incorporated herein by reference.

FIELD

The present invention relates to a numerical control device for controlling an additive manufacturing apparatus, an additive manufacturing apparatus for manufacturing a modeled object by applying a material to a workpiece, and a method for controlling an additive manufacturing apparatus.

BACKGROUND

Additive manufacturing apparatuses for manufacturing three-dimensional modeled objects by the direct energy deposition (DED) technology are known. Some additive manufacturing apparatuses manufacture modeled objects by locally melting a material by a beam emitted from a machining head and applying the molten material to a workpiece. An additive manufacturing apparatus in which a wire, which is a metal material, is used as the material forms linear beads, which are solidification results of a molten metal material, by moving the irradiation position of the beam while supplying the wire to the irradiation position. The additive manufacturing apparatus manufactures modeled objects by depositing beads.

Irregularities, which are errors in height, may appear on a deposit of beads owing to heat accumulated in the deposit or other factors. A bead formed under a constant machining condition and deposited on a deposit on which irregularities appear will have irregularities similar to the aforementioned irregularities or irregularities with more height differences than those of the aforementioned irregularities. It is difficult for the additive manufacturing apparatus to achieve high machining accuracy owing to formation of such irregularities.

Patent Literature 1 discloses a method for welding a metal material by irradiating the metal material with laser light while supplying a wire to the metal material, in which a machining condition is adjusted on the basis of a load current of a motor that is a drive source for feeding the wire. According to the method of Patent Literature 1, a state of contact between the wire and the workpiece is determined on the basis of the load current, and adjustment to make the value of the load current closer to a predetermined reference value is performed to stabilize the contact state.

CITATION LIST

Patent Literature

Patent Literature 1: Japanese Patent Application Laid-open No. H08-309535

SUMMARY

Technical Problem

The technology of the related art according to Patent Literature 1 mentioned above has problems in that, even when the adjustment for stabilizing the contact state is performed, the height cannot be uniformized by preventing the irregularities and the increase in the irregularities, and high machining accuracy may not be achieved, as described above.

The present invention has been made in view of the above, and an object thereof is to provide a numerical control device that can make an additive manufacturing apparatus perform machining with high machining accuracy, an additive manufacturing apparatus, and a method for controlling an additive manufacturing apparatus.

Solution to Problem

To solve the aforementioned problems and achieve the object, a numerical control device according to the present invention controls an additive manufacturing apparatus for manufacturing a modeled object by irradiating a material fed by a driving force of a driving unit with a beam and applying the molten material to a workpiece. The numerical control device according to the present invention includes an error detecting unit that detects an error in height of the workpiece in a height direction in which the material is deposited, and an adjustment unit that adjusts a supply amount of the material on the basis of the error.

Advantageous Effects of Invention

A numerical control device according to the present invention produces an advantageous effect of enabling an additive manufacturing apparatus to perform machining with high machining accuracy.

BRIEF DESCRIPTION OF DRAWINGS

FIG. 12 is a diagram explaining detection of an error in each section and adjustment of the supply amount in each section performed by the NC device illustrated in FIG. 2.

FIG. 13 is a diagram explaining adjustment of a supply rate in sections performed by the NC device illustrated in FIG. 2.

DESCRIPTION OF EMBODIMENTS

A numerical control device, an additive manufacturing apparatus, and a method for controlling an additive manufacturing apparatus according to certain embodiments of the present invention will be described in detail below with reference to the drawings. Note that the present invention is not limited to the embodiments. In the following description, the numerical control device may be referred to as a numerical control (NC) device.

First Embodiment

Figure 1:
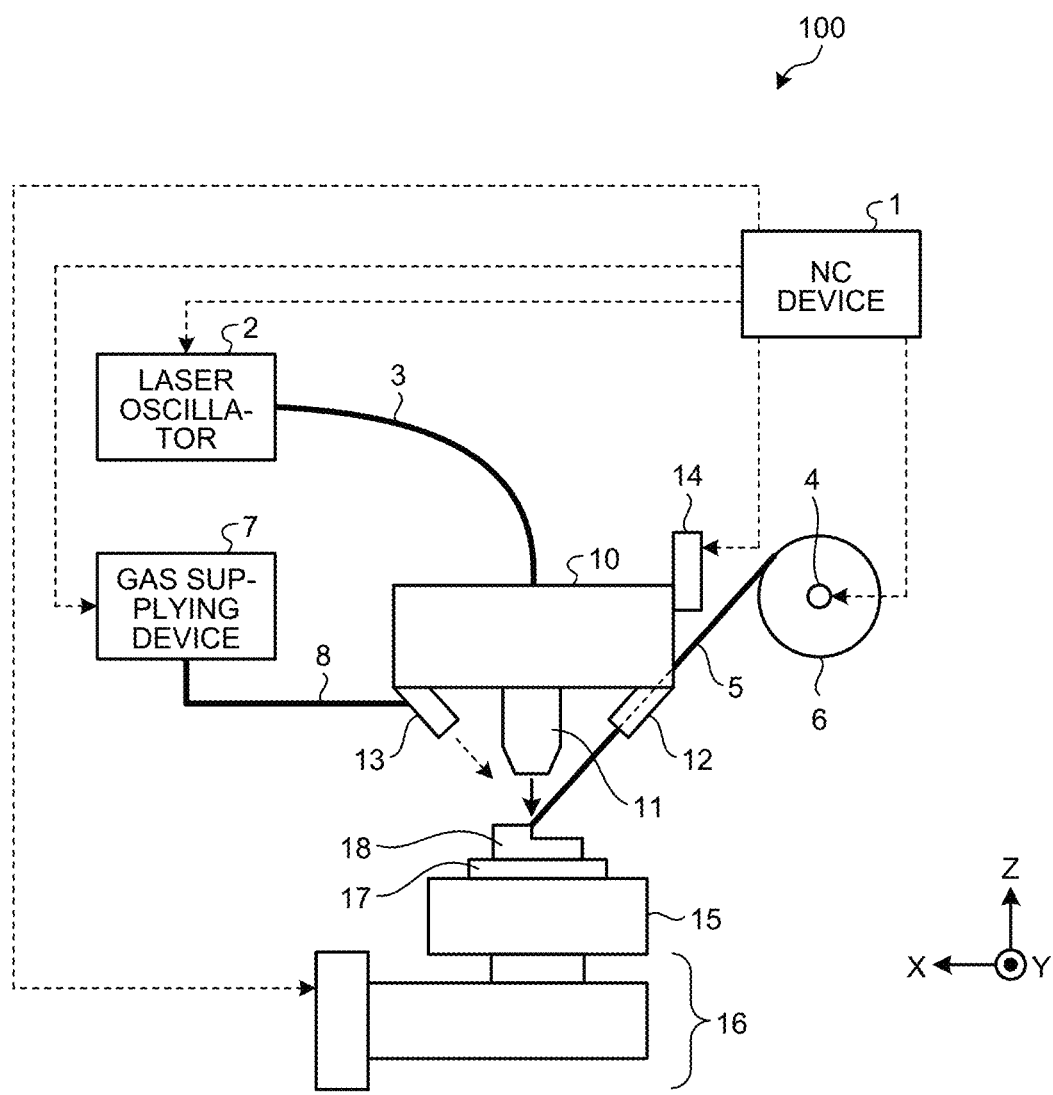
FIG. 1 is a diagram illustrating an additive manufacturing apparatus controlled by an NC device according to a first embodiment of the present invention.

FIG. 1 is a diagram illustrating an additive manufacturing apparatus 100 controlled by an NC device 1 according to a first embodiment of the present invention. The additive manufacturing apparatus 100 is a machine tool for manufacturing a modeled object by irradiating a material fed by a driving force of a driving unit with a beam, and applying the molten material to a workpiece. In the first embodiment, the beam is a laser beam, and the material is a wire 5, which is a metal material.

The additive manufacturing apparatus 100 forms a deposit 18 of the metal material on the surface of a base material 17 by depositing beads on the base material 17. The beads are linear objects formed by solidification of the molten wire 5. The base material 17 is placed on a stage 15. In the following description, the workpiece refers to the base material 17 and the deposit 18. The modeled object refers to the base material 17 and the deposit 18 after application of materials according to a machining program is finished. The base material 17 illustrated in FIG. 1 is a plate. The base material 17 may be a material other than a plate.

The additive manufacturing apparatus 100 includes a machining head 10 that includes a beam nozzle 11, a wire nozzle 12, and a gas nozzle 13. The beam nozzle 11 emits a laser beam for melting a material toward the workpiece. The wire nozzle 12 advances the wire 5 toward the laser beam irradiation position on the workpiece. The gas nozzle 13 produces a jet of gas for inhibiting the oxidation of the deposit 18 and cooling the beads toward the workpiece.

A laser oscillator 2, which is a beam source, oscillates a laser beam. The laser beam from the laser oscillator 2 is propagated to the beam nozzle 11 via a fiber cable 3, which is an optical transmission path. A gas supplying device 7 supplies gas to the gas nozzle 13 via piping 8.

A wire spool 6 around which the wire 5 is wound is a material supply source. A rotary motor 4, which is a servomotor, is a driving unit that drives the wire spool 6. The rotary motor 4 generates a driving force for feeding the wire 5 from the wire spool 6. The wire spool 6 rotates with the driving of the rotary motor 4. The wire 5 is fed from the wire spool 6 by the rotation of the wire spool 6.

The wire 5 fed from the wire spool 6 passes through the wire nozzle 12 and supplied to the irradiation position of the laser beam. Note that the wire nozzle 12 may be provided with an operation mechanism for pulling out the wire 5 from the wire spool 6. The additive manufacturing apparatus 100 is provided with at least one of the rotary motor 4 coupled to the wire spool 6 and the operation mechanism for the wire nozzle 12, which enables supply of the wire 5 to the irradiation position of the laser beam. Such an operation mechanism is a driving unit for supply of the material. In FIG. 1, the operation mechanism for the wire nozzle 12 is not illustrated.

A head driving unit 14 moves the machining head 10 in each of the X-axis direction, the Y-axis direction, and the Z-axis direction. The X axis, the Y axis, and the Z axis are three axes perpendicular to each other. The X axis and the Y axis are parallel to the horizontal direction. The Z-axis direction is the height direction along which the material is deposited, that is, the vertical direction. Note that the direction indicated by an arrow in FIG. 1 along the X-axis direction may be referred to as a positive X direction, and the direction opposite the positive X direction may be referred to as a negative X direction. Note that the direction indicated by an arrow in FIG. 1 along the Y-axis direction may be referred to as a positive Y direction, and the direction opposite the positive Y direction may be referred to as a negative Y direction. The direction indicated by an arrow in FIG. 1 along the Z-axis direction may be referred to as a positive Z direction, and the direction opposite the positive Z direction may be referred to as a negative Z direction. The positive Z direction is a vertically upward direction. The negative Z direction is a vertically downward direction.

The head driving unit 14 includes a servomotor constituting an operation mechanism for moving the machining head 10 in the X-axis direction, a servomotor constituting an operation mechanism for moving the machining head 10 in the Y-axis direction, and a servomotor constituting an operation mechanism for moving the machining head 10 in the Z-axis direction. The head driving unit 14 is an operation mechanism that enables translational movement in each of the directions of the three axes. In FIG. 1, the servomotors are not illustrated. The additive manufacturing apparatus 100 moves the irradiation position of the laser beam on the workpiece by moving the machining head 10 by the driving of the head driving unit 14.

The machining head 10 illustrated in FIG. 1 makes the laser beam travel in the negative Z direction from the beam nozzle 11. The wire nozzle 12 is provided at a position away from the beam nozzle 11 in the XY plane, and advances the wire 5 in a direction at an angle to the Z axis. In addition, the machining head 10 may advance the wire 5 along the central axis of a laser beam emitted from the beam nozzle 11. Thus, the beam nozzle 11 and the wire nozzle 12 may be arranged coaxially. The beam nozzle 11 may emit a laser beam with a shape of the beam cross section adjusted to a ring shape around the wire 5, or a plurality of beams distributed around the wire 5. Such laser beams are adjusted so as to converge at the irradiation position on the workpiece.

The gas nozzle 13 of the machining head 10 illustrated in FIG. 1 is provided at a position away from the beam nozzle 11 in the XY plane, and produces a jet of gas in a direction at an angle to the Z axis. In addition, the machining head 10 may produce a jet of gas along the central axis of the laser beam emitted from the beam nozzle 11. Thus, the beam nozzle 11 and the gas nozzle 13 may be arranged coaxially.

A rotational driving unit 16 is an operation mechanism that enables rotational movement about each of two axes. The rotational driving unit 16 includes a servomotor constituting an operation mechanism for rotating the stage 15 about the Z axis, and a servomotor constituting an operation mechanism for rotating the stage 15 about the X axis. In FIG. 1, the servomotors are not illustrated. The rotational driving unit 16 turns the workpiece together with the stage 15. The additive manufacturing apparatus 100 is capable of making the posture of the workpiece suitable for machining by turning the stage 15 by the rotational driving unit 16.

An NC device 1 controls the additive manufacturing apparatus 100 in accordance with a machining program. The NC device 1 outputs an axis command to the head driving unit 14 to control the head driving unit 14. The NC device 1 outputs an output command, which is a command according to the condition of beam output, to the laser oscillator 2 to control the laser oscillation of the laser oscillator 2.

The NC device 1 outputs a supply command, which is a command according to the condition of the material supply amount, to the rotary motor 4 to control the rotary motor 4. The NC device 1 controls the rotary motor 4 such that the velocity of the wire 5 moving from the wire spool 6 toward the irradiation position is adjusted. In the following description, such velocity may also be referred to as supply rate. The supply rate refers to the amount of supply of a material per hour.

The NC device 1 outputs a command according to the condition of the gas supply amount to the gas supplying device 7 to control the amount of gas supply from the gas supplying device 7 to the gas nozzle 13. The NC device 1 outputs a rotation command to the rotational driving unit 16 to control the rotational driving unit 16. Note that the NC device 1 may be one of the components of the additive manufacturing apparatus 100 or a device external to the additive manufacturing apparatus 100.

Figure 2:
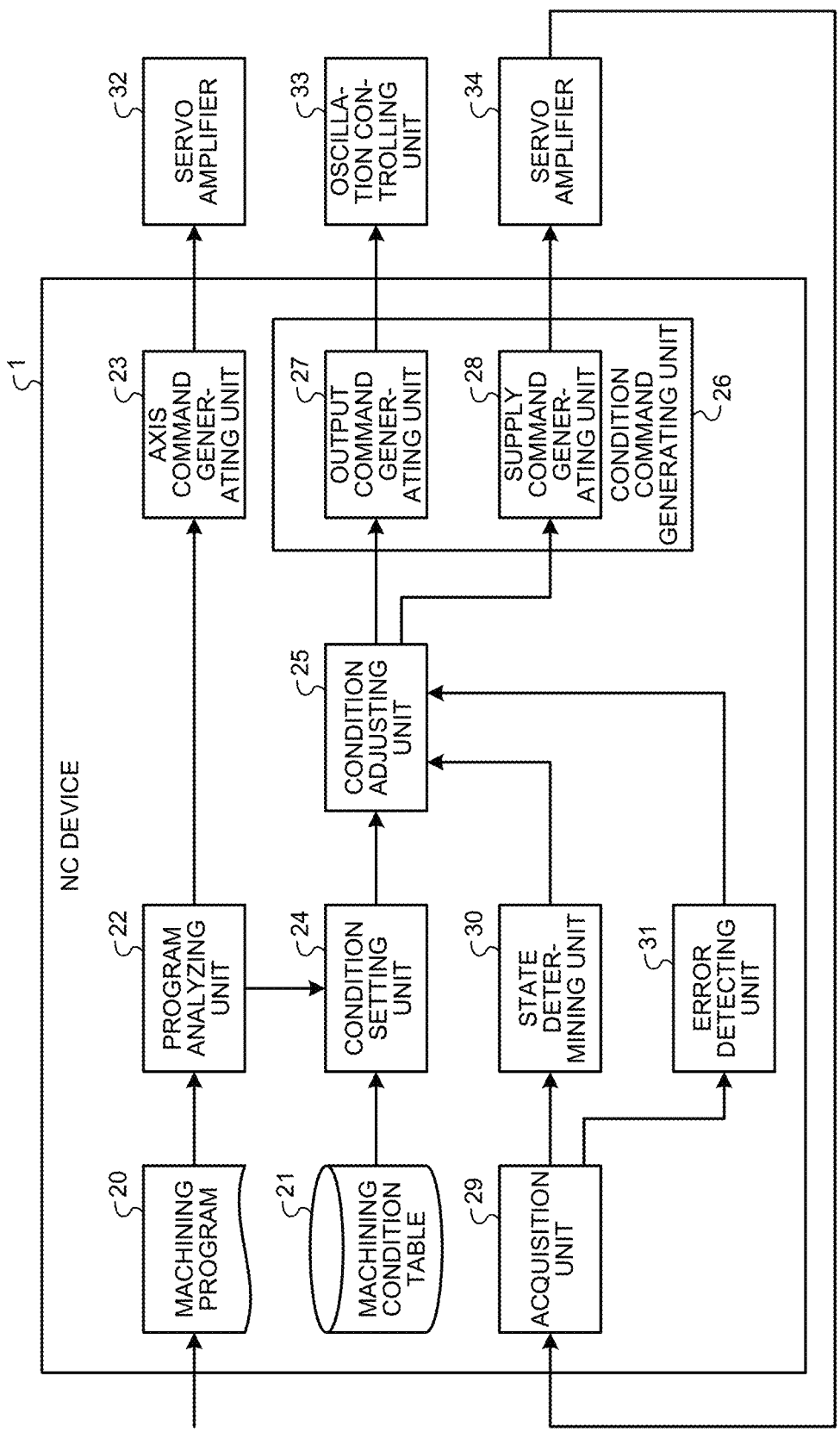
FIG. 2 is a diagram illustrating a functional configuration of the NC device that controls the additive manufacturing apparatus illustrated in FIG. 1.

FIG. 2 is a diagram illustrating a functional configuration of the NC device 1 that controls the additive manufacturing apparatus 100 illustrated in FIG. 1. A machining program 20, which is an NC program created by a computer aided manufacturing (CAM) device, is input to the NC device 1. The machining program 20 specifies a machining path, which is a path along which the irradiation position of the laser beam is moved, in accordance with an instruction of a moving path along which the machining head 10 is moved relative to the workpiece placed on the stage 15.

The NC device 1 includes a machining condition table 21 in which data of various machining conditions are stored. The machining program 20 includes a command for selecting a machining condition from among the machining conditions whose data are stored in the machining condition table 21.

The NC device 1 includes a program analyzing unit 22 that analyzes the machining program 20, and an axis command generating unit 23 that generates an axis command on the basis of a result of analysis of the program analyzing unit 22. The program analyzing unit 22 analyzes a movement path along which the machining head 10 is to be moved on the basis of the details of processes described in the machining program 20. The program analyzing unit 22 outputs data representing the analyzed movement path to the axis command generating unit 23. The axis command generating unit 23 generates an axis command, which is a group of interpolation points per unit time on the movement path.

The NC device 1 includes a condition setting unit 24 that sets a machining condition, a condition adjusting unit 25 that adjusts the machining condition, and a condition command generating unit 26 that generates a command in accordance with the machining condition. The program analyzing unit 22 obtains information for specifying a machining condition from the machining program 20, and outputs the obtained information to the condition setting unit 24. The condition setting unit 24 reads data of the machining condition specified in the machining program 20 from the machining condition table 21 on the basis of the information from the program analyzing unit 22. In this manner, the condition setting unit 24 sets a machining condition for additive machining.

Note that the NC device 1 may also obtain data of a machining condition on the basis of the machining program 20 in which data of the machining condition are described, instead of obtaining the data a specified machining condition from the data of various machining conditions stored in the advance in the machining condition table 21. In this case as well, the program analyzing unit 22 can obtain the data of the machining condition by analyzing the machining program 20. The program analyzing unit 22 outputs the obtained data of the machining condition to the condition adjusting unit 25.

The condition adjusting unit 25 obtains the data of the set machining condition from the condition setting unit 24 and adjusts the machining condition. The condition adjusting unit 25 outputs data of the adjusted machining condition to the condition command generating unit 26. The condition adjusting unit 25 is an adjustment unit for adjusting the supply amount of the wire 5 on the basis of an error in the height of the workpiece.

The condition command generating unit 26 obtains the data of the machining condition from the condition adjusting unit 25, and generates various commands in accordance with the machining condition. The condition command generating unit 26 includes an output command generating unit 27 that generates an output command for controlling the laser beam output, and a supply command generating unit 28 that generates a supply command for controlling the supply of the wire 5. The NC device 1 outputs the axis command generated by the axis command generating unit 23, the output command generated by the output command generating unit 27, and the supply command generated by the supply command generating unit 28.

The head driving unit 14 illustrated in FIG. 1 includes a servo amplifier 32 for controlling the driving of each of the servomotors included in the head driving unit 14. The servo amplifier 32 controls the driving of each of the servomotors in accordance with the axis command output from the NC device 1.

The laser oscillator 2 illustrated in FIG. 1 includes an oscillation controlling unit 33 that controls the laser oscillation. The oscillation controlling unit 33 controls the laser oscillation in accordance with the output command output from the NC device 1. The rotary motor 4 illustrated in FIG. 1 includes a servo amplifier 34 that controls the rotating operation. The servo amplifier 34 controls the driving of the rotary motor 4 in accordance with the supply command output from the NC device 1. The servo amplifier 34 also outputs an estimate of disturbance torque that acts on the rotary motor 4.

In addition, the condition command generating unit 26 outputs a command according to the condition of the gas supply amount to the gas supplying device 7. The axis command generating unit 23 outputs a rotation command to the rotational driving unit 16. In FIG. 2, output of a command to the gas supplying device 7 and output of a rotation command to the rotational driving unit 16 are not illustrated. The NC device 1 controls the entire additive manufacturing apparatus 100 by outputting various commands.

The NC device 1 includes an acquisition unit 29 that acquires the estimate of the disturbance torque that acts on the rotary motor 4 from the servo amplifier 34, a state determining unit 30 that determines the state of contact between the wire 5 and the workpiece, and an error detecting unit 31 that detects an error in the height of the workpiece. The acquisition unit 29 outputs the estimate obtained from the servo amplifier 34 to the state determining unit 30 and the error detecting unit 31.

The state determining unit 30 determines the state of contact between the wire 5 and the workpiece on the basis of the estimate obtained from the acquisition unit 29. The state determining unit 30 outputs the determination result of the determination of the contact state to the condition adjusting unit 25. The condition adjusting unit 25 adjusts the machining condition on the basis of the determination result from the state determining unit 30.

The error detecting unit 31 detects the error in the height of the workpiece in the Z-axis direction on the basis of the estimate obtained from the acquisition unit 29. The error detecting unit 31 detects the error when it is determined by the state determining unit 30 that the contact state is a state in which stable machining can be performed. The error detecting unit 31 outputs the detection result of the error detection to the condition adjusting unit 25. The condition adjusting unit 25 adjusts the machining condition on the basis of the detection result from the error detecting unit 31. When it is determined by the state determining unit 30 that the contact state is a state in which stable machining can be performed, the condition adjusting unit 25 adjusts the supply amount of the wire 5 on the basis of the error detected by the error detecting unit 31.

Next, a hardware configuration of the NC device 1 will be described. The respective functional units of the NC device 1 illustrated in FIG. 2 are implemented by control programs, which are programs for performing a method for controlling the additive manufacturing apparatus 100 of the first embodiment, being executed with use of hardware.

Figure 3:
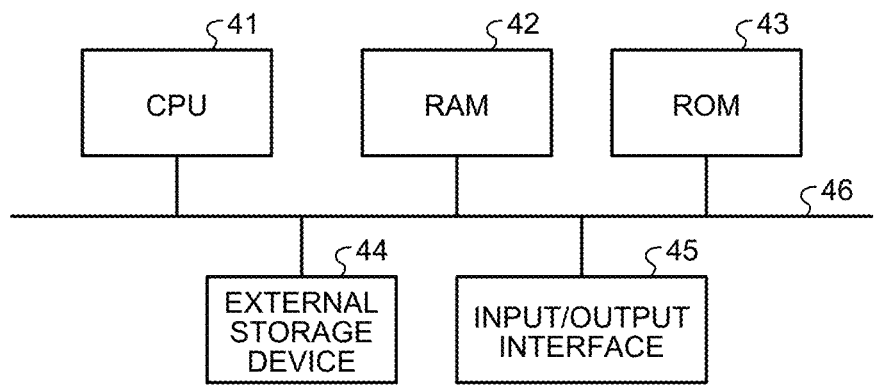
FIG. 3 is a block diagram illustrating a hardware configuration of the NC device according to the first embodiment.

FIG. 3 is a block diagram illustrating a hardware configuration of the NC device 1 according to the first embodiment. The NC device 1 includes a central processing unit (CPU) 41 that performs various processes, a random access memory (RAM) 42 including a data storage area, a read only memory (ROM) 43, which is a nonvolatile memory, an external storage device 44, and an input/output interface 45 for inputting information to the NC device 1 and outputting information from the NC device 1. The respective components illustrated in FIG. 3 are connected with one another via a bus 46.

The CPU 41 executes programs stored in the ROM 43 and the external storage device 44. The program analyzing unit 22, the axis command generating unit 23, the condition setting unit 24, the condition adjusting unit 25, the condition command generating unit 26, the output command generating unit 27, the supply command generating unit 28, the state determining unit 30, and the error detecting unit 31 illustrated in FIG. 2 are implemented with use of the CPU 41.

The external storage device 44 is a hard disk drive (HDD) or a solid state drive (SSD). The external storage device 44 stores the control programs and various data. The external storage device 44 stores the machining program 20 and the machining condition table 21 illustrated in FIG. 2. The ROM 43 stores software or a program for controlling hardware, which is a boot loader such as a basic input/output system (BIOS) or a unified extensible firmware interface (UEFI) that is a basic program for controlling a computer or a controller that is the NC device 1. Note that the control programs may be stored in the ROM 43.

The programs stored in the ROM 43 and the external storage device 44 are loaded into the RAM 42. The CPU 41 loads the control programs in the RAM 42 to perform various processes. The input/output interface 45 is an interface for connection with devices external to the NC device 1. The machining program 20 and the data stored in the machining condition table 21 are input to the input/output interface 45. In addition, the input/output interface 45 outputs various commands. The acquisition unit 29 illustrated in FIG. 2 is implemented with use of the input/output interface 45. The NC device 1 may include an input device such as a keyboard and a pointing device, and an output device such as a display.

The control programs may be stored in a storage medium readable by a computer. The NC device 1 may store the control programs stored in a storage medium into the external storage device 44. The storage medium may be a portable storage medium, which is a flexible disk, or a flash memory, which is a semiconductor memory. The control programs may be installed into a computer or a controller that is the NC device 1 from another computer or a server via a communication network.

The functions of the NC device 1 may be implemented by processing circuity that is dedicated hardware for controlling the additive manufacturing apparatus 100. The processing circuity is a single circuit, a composite circuit, a programmed processor, a parallel-programmed processor, an application specific integrated circuit (ASIC), a field-programmable gate array (FPGA), or a combination thereof. Some of the functions of the NC device 1 may be implemented by dedicated hardware, and the others may be implemented by software or firmware.

Figure 4:
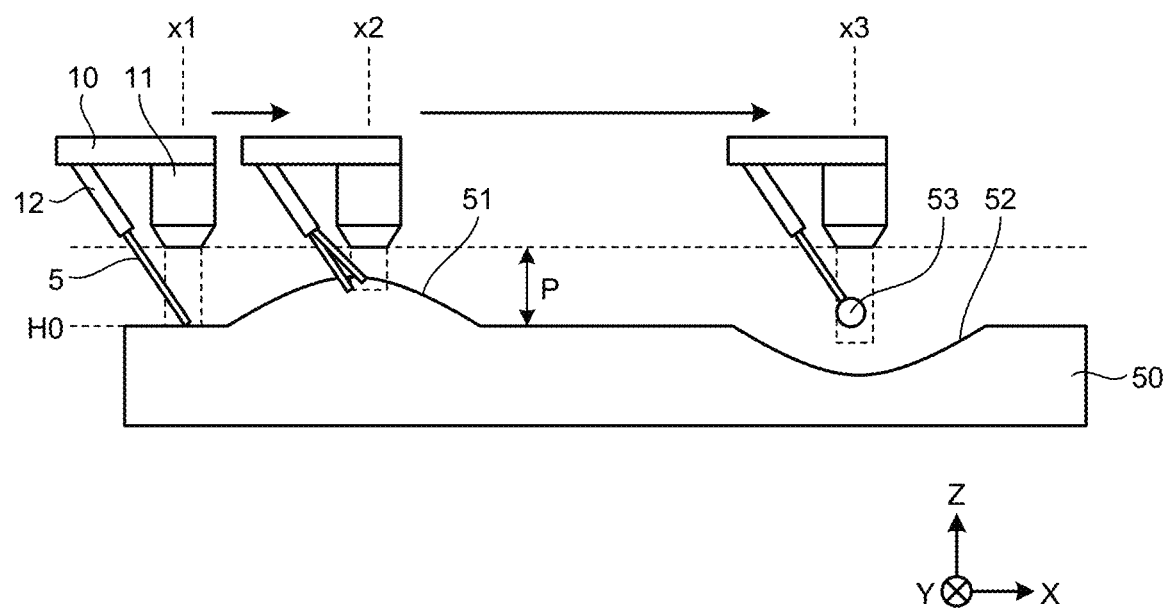
FIG. 4 is a diagram explaining determination performed by a state determining unit included in the NC device illustrated in FIG. 2.

Next, the determination performed by the state determining unit 30 will be explained. FIG. 4 is a diagram explaining the determination performed by the state determining unit 30 included in the NC device 1 illustrated in FIG. 2. FIG. 4 illustrates the machining head 10, and the beam nozzle 11 and the wire nozzle 12 provided in the machining head 10 among the components of the additive manufacturing apparatus 100 illustrated in FIG. 1 in a simplified manner.

The additive manufacturing apparatus 100 forms the beads by moving the machining head 10 while supplying the wire 5 to the irradiation position of the laser beam. In the example illustrated in FIG. 4, the additive manufacturing apparatus 100 moves the machining head 10 in the positive X direction to form a bead with its longitudinal direction in the X-axis direction. A bead of a first layer is formed directly on the base material 17. A bead of a second layer is formed on the bead of the first layer. The additive manufacturing apparatus 100 deposits a plurality of beads to form the deposit 18. FIG. 4 illustrates one bead 50 formed in the deposit 18. The machining head 10 illustrated in FIG. 4 is the machining head 10 when a bead on this bead 50 is formed.

Assume that the additive manufacturing apparatus 100 has formed the bead 50 under a constant machining condition for making the thickness of the bead 50 in the Z-axis direction uniform. Note that the distance between the bead 50 and the machining head 10 will be referred to as a pitch P. The pitch P in a case where the bead 50 is formed with a uniform thickness will be referred to as a reference pitch.

Even when the additive manufacturing apparatus 100 is controlled such that a bead 50 with a uniform thickness will be formed, irregularities may appear on the bead 50 to be formed owing to heat accumulated in the deposit 18 or other factors. The irregularity appearing on the bead 50 causes an error in the height of the workpiece including the deposit 18.

A height H0 represents the height of the workpiece when the bead 50 is formed in a case where the bead 50 is formed with a uniform thickness. The height of the workpiece is a height from a reference surface. The reference surface is a surface of the stage 15 on which the base material 17 is placed, for example. A convex portion 51 is a portion of the bead 50 which is convex in the positive Z direction relative to the height H0. A concave portion 52 is a portion of the bead 50 which is concave in the negative Z direction relative to the height H0.

In FIG. 4, positions x1, x2, and x3 are positions in the X-axis direction. The height of the upper end of the bead 50 at the position x1 is the height H0. When the center of the beam cross section of the laser beam is at the position x1, the pitch P is the reference pitch. In this case, the leading end of the wire 5 fed at a supply rate in accordance with a supply command travels toward the center of the beam cross section to reach the bead 50. The wire 5 comes into contact with the bead 50 with an appropriate strength, and melts. The stable state refers to a contact state when the wire 5 is in contact with the bead 50 with an appropriate strength and an appropriate load with which stable machining can be performed is applied to the wire 5.

The position x2 is a position at which the convex portion 51 is formed. When the center of the beam cross section of the laser beam is at the position x2, the pitch P is shorter than the reference pitch. When the center of the beam cross section is at the position x2, the leading end of the wire 5 fed at a supply rate in accordance with a supply command travels toward the center of the beam cross section, and reaches the surface of the bead 50 without reaching the center of the beam cross section. While the distance between the position of the bead 50 at which the wire 5 reaches and the wire nozzle 12 is shorter than that in the case where the pitch P is the reference pitch, the rotary motor 4 attempts to continue feeding the wire 5 at the supply rate in accordance with the supply command, which results in that wire 5 comes in contact with the bead 50 with an excessive strength. The contact state between the wire 5 and the bead 50 at this point is referred to as an overloaded state. In the overloaded state, a phenomenon such as vibration of the wire 5 or damage to the wire 5 may occur. FIG. 4 illustrates a state in which the wire 5 vibrates when the center of the beam cross section is at the position x2. The overloaded state is a contact state when an excessive load with which stable machining cannot be performed is applied to the wire 5.

The position x3 is a position at which the concave portion 52 is formed. When the center of the beam cross section of the laser beam is at the position x3, the pitch P is longer than the reference pitch. When the center of the beam cross section is at the position x3, the leading end of the wire 5 fed at the supply rate in accordance with the supply command travels toward the center of the beam cross section, and melts in a state in which the wire 5 is not in contact with the bead 50. At this point, the wire 5 and the bead 50 are in a non-contact state with each other. In the non-contact state, no load is applied to the wire 5. In the non-contact state, the wire 5 melts at a position higher than the bead 50, and a phenomenon that a droplet 53 of the molten material falls on the bead 50 may occur. At a portion of the bead 50 on which the droplet 53 fell, the supply amount of the material is increased as compared with the case where machining is performed in the stable state described above, which deteriorates the shape accuracy.

The state determining unit 30 determines which of the stable state, the overloaded state, and the non-contact state the contact state corresponds to on the basis of the estimate of the disturbance torque. In the following description, the estimate of the disturbance torque may also be referred to as estimated disturbance torque. The estimated disturbance torque in the overloaded state is higher than the estimated disturbance torque in the stable state. The state determining unit 30 determines that the contact state is the overloaded state when the estimated disturbance torque is larger than a preset threshold. The threshold is disturbance torque when the load applied to the wire 5 is the upper limit of the load with which stable machining can be performed. In contrast, when the wire 5 is in the non-contact state, no factor of disturbance to the rotary motor 4 through the wire 5 is present, and the estimated disturbance torque is thus zero. When the estimated disturbance torque is zero, the state determining unit 30 determines that the contact state is the non-contact state. When the contact state is determined to be neither of the overloaded state and the non-contact state, the state determining unit 30 determines that the contact state is the stable state. In this manner, the state determining unit 30 estimates the state of the wire 5 on the basis of the estimated disturbance torque to determine which of the stable state, the overloaded state, and the non-contact state the contact state corresponds to.

Note that the state determining unit 30 may include, in the non-contact state, a state in which the load applied to the wire 5 is very small and a slight contact is present but the contact state can readily become a non-contact state. In this case, a second threshold that is a threshold different from a first threshold for determination of the overloaded state is set in advance for the state determining unit 30. The state determining unit 30 determines that the contact state is the non-contact state when the estimated disturbance torque is smaller than the second threshold.

Here, the disturbance torque will be explained. The servo amplifier 34 calculates the estimated disturbance torque that acts on the rotary motor 4. Actual torque that is torque for the rotary motor 4 to drive is a sum of rotational torque that is torque needed for rotation of a shaft and the disturbance torque acting on the shaft through the wire 5. The rotational torque is estimated as a sum of an inertia term representing torque of a rotational moment of the shaft and a viscosity term representing torque of friction. The estimated torque, which is a sum of the inertia term and the viscosity term, is calculated on the basis of physical properties of the shaft, which is a body of rotation. Thus, the estimated disturbance torque is calculated by subtracting the estimated torque from the actual torque.

Next, the adjustment of the machining condition performed by the condition adjusting unit 25 based on the result of determination by the state determining unit 30 will be explained. The condition adjusting unit 25 adjusts the supply rate when the contact state is determined to be the overloaded state and when the contact state is determined to be the non-contact state. The NC device 1 improves the contact state of the wire 5 from the overloaded state or the non-contact state to the stable state by the adjustment of the supply rate performed by the condition adjusting unit 25.

Figure 5:
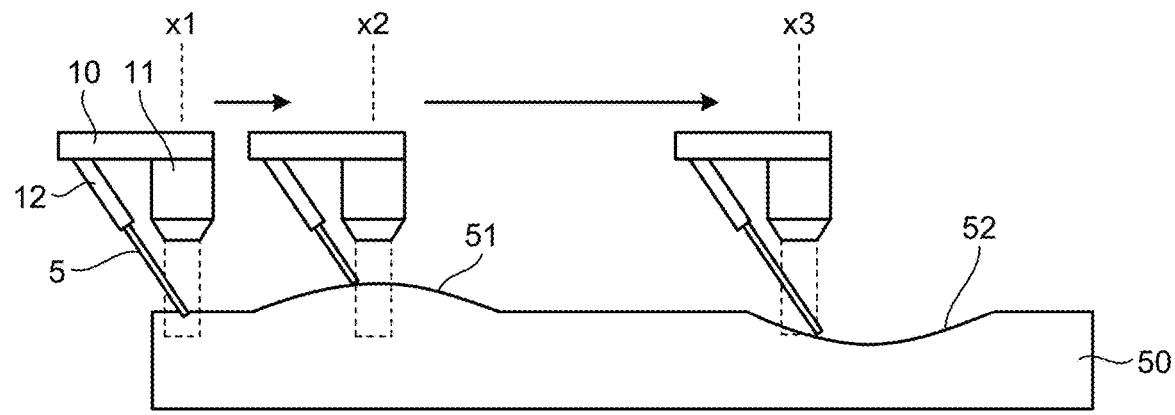
FIG. 5 is a diagram explaining adjustment based on a result of determination performed by the state determining unit included in the NC device illustrated in FIG. 2.

FIG. 5 is a diagram explaining the adjustment based on the result of determination performed by the state determining unit 30 included in the NC device 1 illustrated in FIG. 2. The condition adjusting unit 25 performs the adjustment for improvement from the overloaded state to the stable state on the position x2. The condition adjusting unit 25 performs adjustment of lowering the velocity value to a value lower than the supply rate based on the setting at the condition setting unit 24, on the position x2. The advancement of the wire 5 is made to be slower than that according to the setting under the machining condition, so that the wire 5 melts at a position in the positive Z direction relative to that in the case where the wire 5 advances at the supply rate based on the setting. The additive manufacturing apparatus 100 can make the improvement from the overloaded state to the stable state by melting the wire 5 at the position of the bead 50 with which the wire 5 comes in contact.

The condition adjusting unit 25 performs the adjustment for improvement from the non-contact state to the stable state on the position x3. The condition adjusting unit 25 performs adjustment of increasing the velocity value to a value higher than the supply rate based on the setting at the condition setting unit 24, on the position x3. The advancement of the wire 5 is made to be faster than that according to the setting under the machining condition, so that the wire 5 melts at a position in the negative Z direction relative to that in the case where the wire 5 advances at the supply rate based on the setting. The additive manufacturing apparatus 100 can make the improvement from the non-contact state to the stable state by melting the wire 5 at the position of the bead 50 with which the wire 5 comes in contact.

The NC device 1 is capable of stabilizing the machining by the adjustment of the supply rate based on the result of determination by the state determining unit 30. After the stabilization, the NC device 1 performs detection of errors by the error detecting unit 31. The NC device 1 further performs adjustment for uniformizing the height of the workpiece on the basis of the result of detection of errors.

Next, the detection of errors performed by the error detecting unit 31 will be explained. The NC device 1 performs the detection of errors by the error detecting unit 31 after the irregularities of the deposit 18 are eliminated to such an extent that stable machining can be performed. The error detecting unit 31 performs the detection of errors when the obtained estimated disturbance torque has a value within a range in which the contact state is determined to be the stable state by the state determining unit 30. Specifically, the error detecting unit 31 detects errors when the obtained estimated disturbance torque is smaller than the first threshold and larger than the second threshold.

The error detecting unit 31 does not perform the detection of errors when the obtained estimated disturbance torque has a value not within a range in which the contact state is determined to be the stable state by the state determining unit 30. Specifically, the error detecting unit 31 does not detect errors when the obtained estimated disturbance torque is larger than the first threshold or when the obtained estimated disturbance torque is smaller than the second threshold. Note that the error detecting unit 31 may be configured to detect errors or may be configured not to detect errors when the obtained estimated disturbance torque is equal to the first threshold or when the obtained estimated disturbance torque is equal to the second threshold. In addition, the error detecting unit 31 may obtain a result of determination by the state determining unit 30 from the state determining unit 30, and determine whether or not to detect errors on the basis of the obtained determination result.

As the pitch P is shorter than the reference pitch, the load applied to the wire 5 is larger, and thus the estimated disturbance torque is larger. In addition, as the pitch P is longer than the reference pitch, the load applied to the wire 5 is smaller, and thus the estimated disturbance torque is smaller. The error detecting unit 31 obtains an estimate of the height of the workpiece on the basis of the estimated disturbance torque. The error detecting unit 31 detects an error, which is a difference between the estimate and a reference height, which is the height of the workpiece when the pitch P is the reference pitch.

In this manner, the error detecting unit 31 detects an error by estimating the height of the workpiece on the basis of the estimated disturbance torque. Note that, when the wire 5 is separated from the workpiece, that is, when the estimated disturbance torque is zero, the error detecting unit 31 cannot perform the estimation of the height based on the estimated disturbance torque. Thus, the error detecting unit 31 detects errors after stabilization by adjustment based on the result of determination by the state determining unit 30.

The NC device 1 can estimate the height of the workpiece on the basis of the estimated disturbance torque of the rotary motor 4 so as to obtain the height of the workpiece by using the rotary motor 4, which is an existing component of the additive manufacturing apparatus 100. With the additive manufacturing apparatus 100, the number of components can be reduced as compared with a case where a sensor for detecting the height of the workpiece is additionally needed. In addition, the manufacture cost of the additive manufacturing apparatus 100 can be reduced as compared with a case where a non-contact sensor such as a laser sensor is used.

Figure 6:
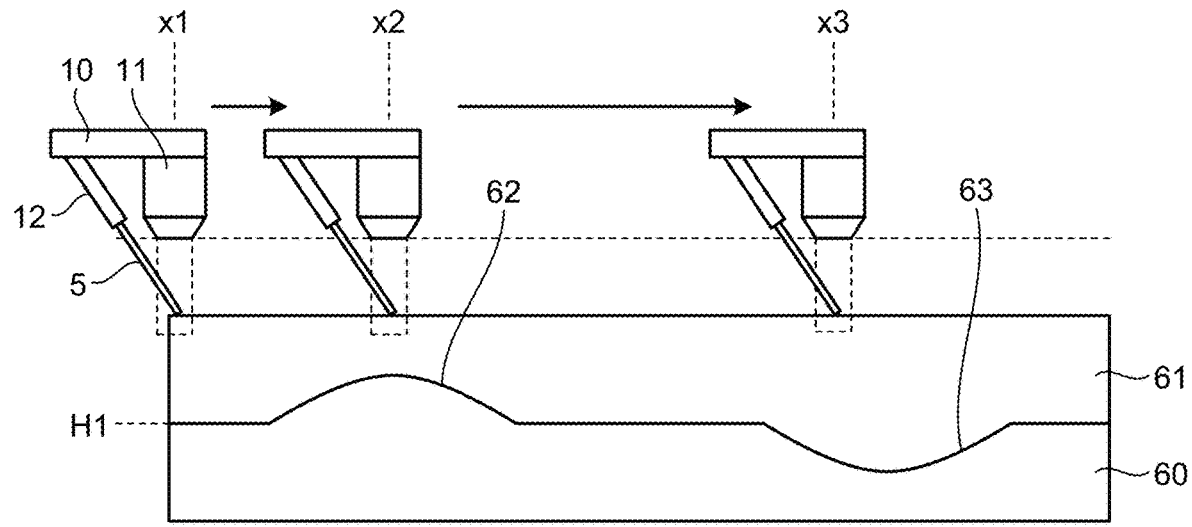
FIG. 6 is a diagram explaining adjustment based on a result of detection performed by an error detecting unit included in the NC device illustrated in FIG. 2.

Next, the adjustment of the machining condition performed by the condition adjusting unit 25 based on the result of detection by the error detecting unit 31 will be explained. FIG. 6 is a diagram explaining the adjustment based on the result of detection by the error detecting unit 31 included in the NC device 1 illustrated in FIG. 2.

In FIG. 6, assume that a bead 60 is formed after the stabilization described above and after the formation of the bead 50 described above. The bead 60 has a convex portion 62 that is lower than the convex portion 51 of the bead 50, and a concave portion 63 that is shallower than the concave portion 52 of the bead 50. The irregularities appearing on the bead 60 cause an error in the height of the workpiece including the bead 60.

A height H1 represents the height of the workpiece when the bead 60 is formed in a case where the bead 60 is formed with a uniform thickness. The height H1 is a reference height when the pitch P is the reference pitch. The machining head 10 illustrated in FIG. 6 is the machining head 10 when a bead 61 on this bead 60 is formed.

The height of the upper end of the bead 60 at the position x1 is the height H1. The error at the position x1 is detected to be zero by the error detecting unit 31. Regarding the supply rate at the position x1, the condition adjusting unit 25 does not perform adjustment on the supply rate based on the setting at the condition setting unit 24. The rotary motor 4 feeds the wire 5 to the position x1 at the supply rate based on the setting.

The position x2 is a position at which the convex portion 62 is formed. The error at the position x2 is detected to be a positive error by the error detecting unit 31. The positive error refers to an error when the height of the workpiece is higher than the height H1. The condition adjusting unit 25 performs adjustment of lowering the velocity value to a value lower than the supply rate based on the setting at the condition setting unit 24, on the position x2. The condition adjusting unit 25 adjusts the velocity value by an adjustment amount depending on the error. The rotary motor 4 feeds the wire 5 to the position x2 at a velocity lower than the supply rate based on the setting.

The position x3 is a position at which the concave portion 63 is formed. The error at the position x3 is detected to be a negative error by the error detecting unit 31. The negative error refers to an error when the height of the workpiece is lower than the height H1. The condition adjusting unit 25 performs adjustment of increasing the velocity value to a value higher than the supply rate based on the setting at the condition setting unit 24, on the position x3. The condition adjusting unit 25 adjusts the velocity value by an adjustment amount depending on the error. The rotary motor 4 feeds the wire 5 to the position x3 at a velocity higher than the supply rate based on the setting.

At the position x2, the additive manufacturing apparatus 100 feeds the wire 5 at a velocity lower than the supply rate based on the setting to make the amount of supply of the wire 5 at the position x2 smaller than that at the position x1. At the position x2, the decrease in the amount of supply of the wire 5 compensates for the positive error described above. At the position x3, the additive manufacturing apparatus 100 feeds the wire 5 at a velocity higher than the supply rate based on the setting to make the amount of supply of the wire 5 at the position x3 larger than that at the position x1. At the position x3, the increase in the amount of supply of the wire 5 compensates for the negative error described above. The additive manufacturing apparatus 100 reduces errors in the height of the workpiece when the bead 61 is formed. As a result, the additive manufacturing apparatus 100 can make the height of the workpiece uniform.

Figure 7:
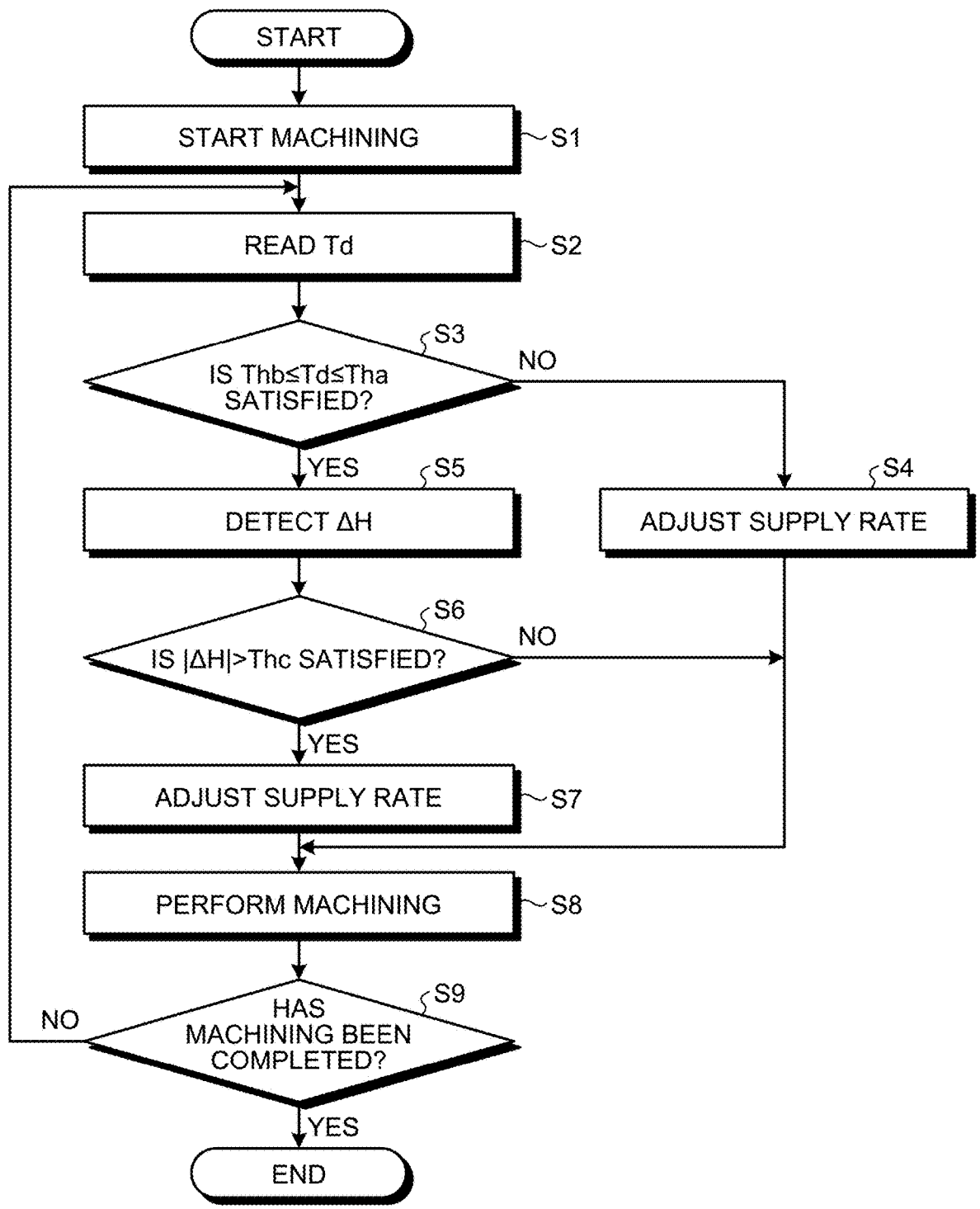
FIG. 7 is a flowchart illustrating procedures of operation of the additive manufacturing apparatus illustrated in FIG. 1.

FIG. 7 is a flowchart illustrating procedures of operation of the additive manufacturing apparatus 100 illustrated in FIG. 1. The NC device 1 performs the determination of the contact state and the detection of an error in the height for each of a plurality of sections into which the workpiece is divided in the direction in which machining is performed. FIG. 7 illustrates procedures of operation until adjustment for uniformization of the height is performed for any of the sections.

In step S1, the additive manufacturing apparatus 100 starts machining of a workpiece. In step S2, the state determining unit 30 reads Td, which is estimated disturbance torque in a section, from the acquisition unit 29. In step S3, the state determining unit 30 determines whether Td in this section satisfies Thb≤Td≤Tha. Tha represents the first threshold for determination of the overloaded state. Thb represents the second threshold for determination of the non-contact state.

Figure 8:
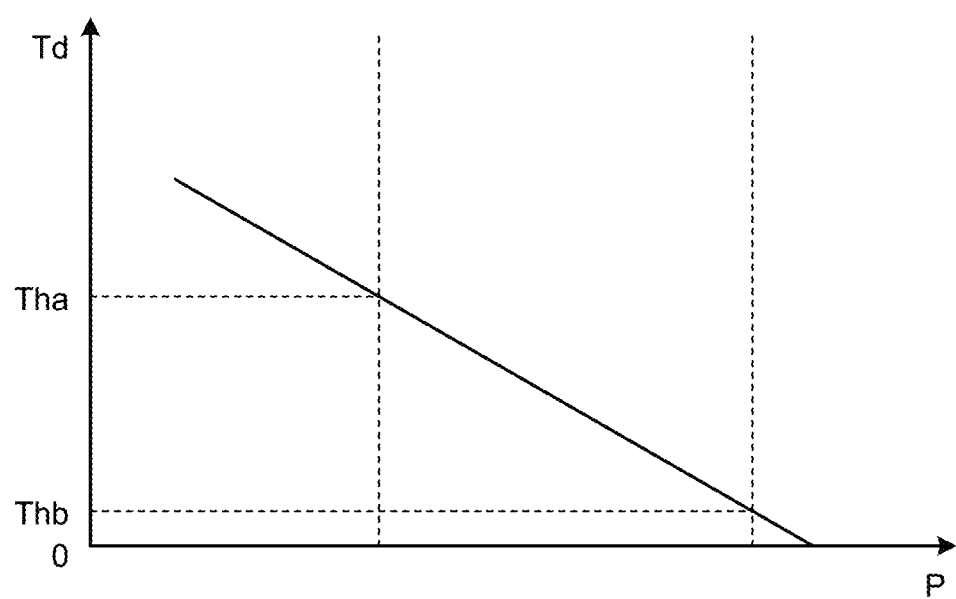
FIG. 8 is a graph explaining thresholds used for determination in the state determining unit included in the NC device illustrated in FIG. 2.

FIG. 8 is a graph explaining the thresholds used for the determination in the state determining unit 30 included in the NC device 1 illustrated in FIG. 2. As the pitch P is larger, Td is smaller. When the wire 5 is separated from the workpiece, Td becomes zero. If it is determined that Thb≤Td≤Tha is not satisfied (step S3, No), the state determining unit 30 determines that the contact state is the overloaded state or the non-contact state. If Tha<Td, the state determining unit 30 determines that the contact state is the overloaded state. If Td<Thb, the state determining unit 30 determines that the contact state is the non-contact state. If the contact state is determined to be the overloaded state or the non-contact state, the condition adjusting unit 25 adjusts the supply rate for this section in step S4.

In the condition adjusting unit 25, a reference value of the estimated disturbance torque is set in advance. The condition adjusting unit 25 adjusts an increase or a decrease in the velocity value such that Td in driving in accordance with the supply command becomes closer to the reference value. The NC device 1 performs adjustment for improvement from the overloaded state to the stable state and adjustment for improvement from the non-contact state to the stable state by feedback control of the supply command in such a manner as to compensate for the difference between Td and the reference value.

The supply command generating unit 28 generates a supply command based on the adjusted supply rate. In step S8, the additive manufacturing apparatus 100 performs machining on this section in accordance with the generated supply command. If the machining of the workpiece has not been completed (step S9, No), the additive manufacturing apparatus 100 repeats the operation of the procedures from step S2. The NC device 1 repeats the process of step S4 until the machining is stabilized.

If it is determined that Thb≤Td≤Tha is satisfied in step S3 (step S3, Yes), the error detecting unit 31 detects ΔH, which is an error in the height of the workpiece in this section, in step S5.

The NC device 1 makes the leading end of the wire 5 function as a contact sensor for estimation of the height of the workpiece. The error detecting unit 31 estimates the height of the workpiece on the basis of Td representing the load applied to the wire 5 when the wire 5 comes into contact with the workpiece. In order that the leading end of the wire 5 functions as a contact sensor, the leading end of the wire 5 needs to constantly melt at the same position within the laser beam in estimation of the height.

Figure 9:
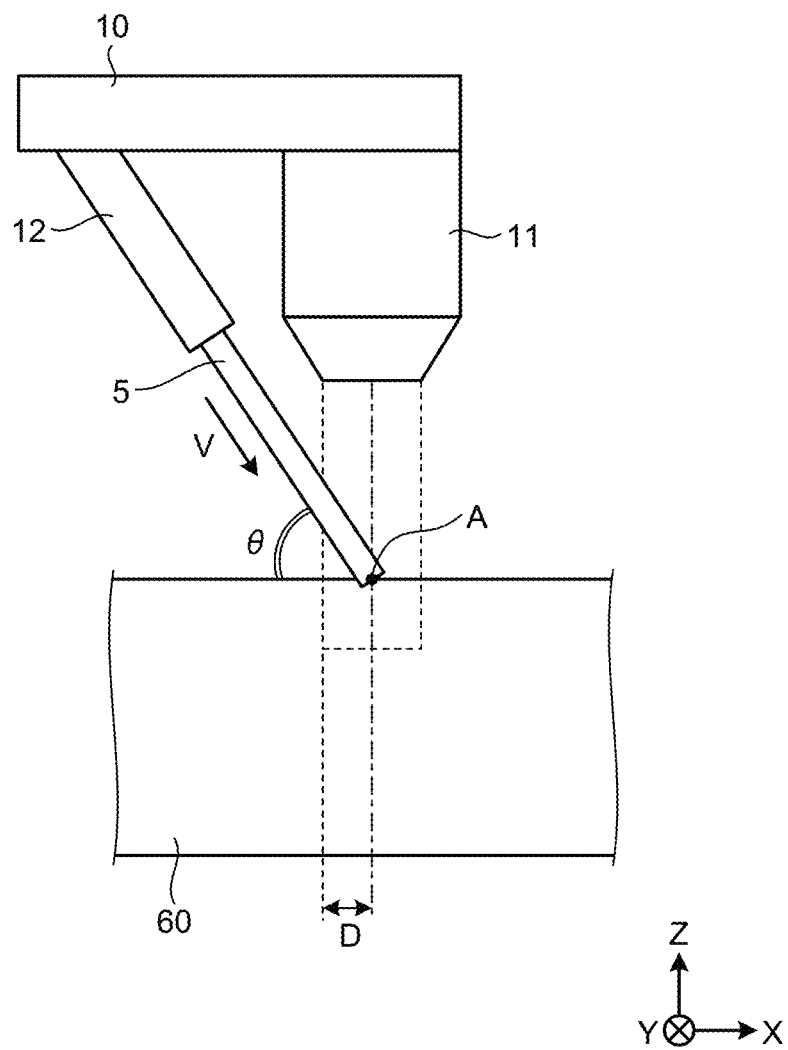
FIG. 9 is a diagram explaining a position at which a wire melts in the additive manufacturing apparatus illustrated in FIG. 1.

FIG. 9 is a diagram explaining a position at which the wire 5 melts in the additive manufacturing apparatus 100 illustrated in FIG. 1. A point A, which is a position at which the leading end of the wire 5 melts, is determined by the relation between the power of the laser beam and the supply rate of the wire 5. The temperature of the wire 5 increases in proportion to the time during which the wire 5 is irradiated with the laser beam. When the temperature of the wire 5 reaches the melting point of the metal material, the wire 5 melts.

The leading end of the wire 5 moves within a beam cross section during a time Tw from when the leading end enters the beam cross section of the laser beam until the wire 5 reaches the melting point. The distance D between the outer edge of the beam cross section and the point A in the X-axis direction satisfies the following formula (1). The unit of the distance D is mm. V represents the supply rate of the wire 5. The unit of the supply rate V is m$^2$/second. θ represents the angle of the traveling direction of the wire 5 with respect to the reference surface described above. The unit of the angle θ is rad. The unit of the time Tw is second. According to formula (1), the distance D representing the position of the point A in the beam cross section and the supply rate V are in a proportional relationship.

$$D = V \cos\theta \times Tw \quad (1)$$

Figure 10:
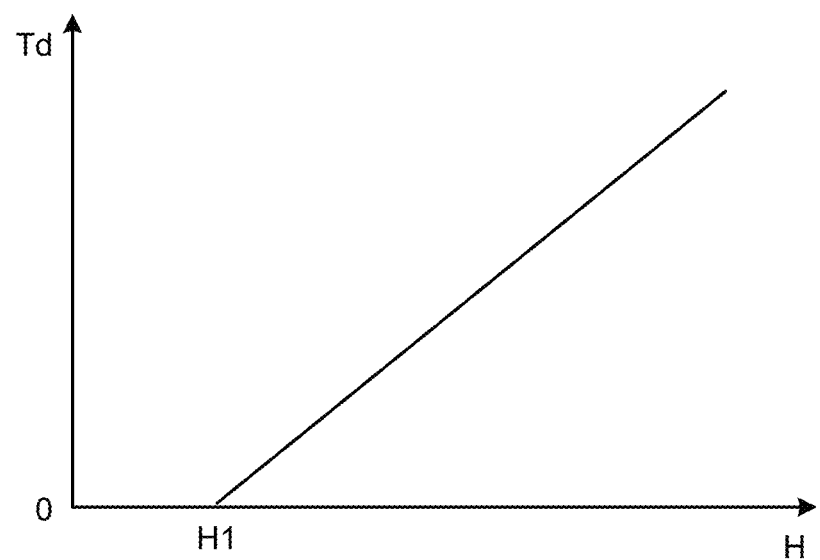
FIG. 10 is a graph explaining estimation of the height of a workpiece performed by the error detecting unit included in the NC device illustrated in FIG. 2.

FIG. 10 is a graph explaining the estimation of the height of the workpiece performed by the error detecting unit 31 included in the NC device 1 illustrated in FIG. 2. FIG. 10 is a graph indicating the relation between the height of the workpiece and the estimated disturbance torque. When the point A illustrated in FIG. 9 is assumed to be the leading end position of the wire 5 in accordance with a command, and the height of the workpiece is higher than the reference height, the leading end position of the wire 5 is a position deviated from the point A. Because proportional control depending on the deviation of the leading end position of the wire 5 from the point A according to a command is performed on the rotary motor 4 by the servo amplifier 34, disturbance torque proportional to the deviation is generated. Thus, the magnitude of the estimated disturbance torque and the height of the workpiece are in a proportional relationship.

As illustrated in FIG. 10, as the height H of the workpiece becomes higher than the height H1, which is the height at the point A, Td becomes larger. When the height H of the workpiece is lower than the height H1, Td is zero. When the height H of the workpiece is higher than the height H1, the error detecting unit 31 estimates the height H of the workpiece on the basis of the relation illustrated in FIG. 10. The error detecting unit 31 detects ΔH, which is a difference between the estimated height H and the height H1.

In step S6, the condition adjusting unit 25 compares an absolute value |ΔH| of ΔH with Thc, which is a third threshold, and determines whether or not |ΔH| is larger than Thc. Thc is assumed to be such a length that the height of the workpiece can be regarded as being equal to the height H1 even when such a difference in length is present therebetween. If |ΔH|>Thc is satisfied (step S6, Yes), the condition adjusting unit 25 adjusts the supply rate for this section in step S7. The supply command generating unit 28 generates a supply command based on the adjusted supply rate. In step S8, the additive manufacturing apparatus 100 performs machining on this section in accordance with the generated supply command. As described above, when |ΔH|>Thc is satisfied, the condition adjusting unit 25 determines that the height of the workpiece is not uniform, and adjusts the supply rate.

In contrast, if |ΔH|>Thc is not satisfied, that is, if |ΔH| is equal to or smaller than Thc (step S6, No), the condition adjusting unit 25 skips the operation in step S7. The supply command generating unit 28 generates a supply command based on the supply rate set by the condition setting unit 24. In step S8, the additive manufacturing apparatus 100 performs machining on this section in accordance with the generated supply command. As described above, when |ΔH|>Thc is not satisfied, the condition adjusting unit 25 determines that the height of the workpiece is uniform, and omits the adjustment of the supply rate.

After step S8, the additive manufacturing apparatus 100 determines whether or not the machining of the workpiece has been completed in step S9. If the machining of the workpiece has not been completed (step S9, No), the additive manufacturing apparatus 100 repeats the operation of the procedures from step S2. If the machining of the workpiece has been completed (step S9, Yes), the additive manufacturing apparatus 100 terminates the operation of the procedures illustrated in FIG. 7.

Figure 11:
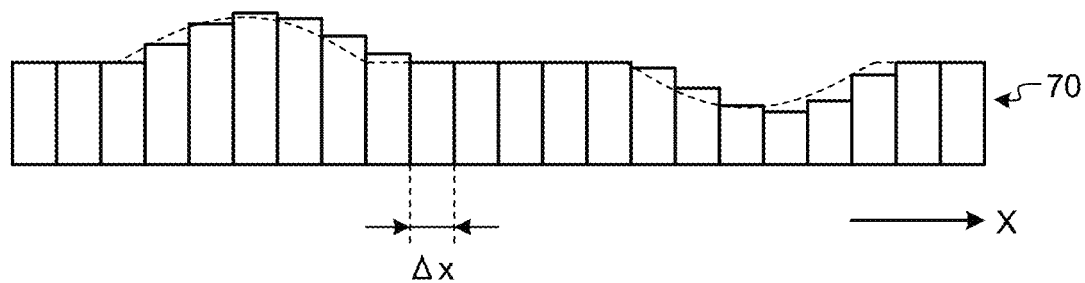
FIG. 11 is a diagram explaining setting of a plurality of sections in processing in the NC device illustrated in FIG. 2.

Next, setting of a plurality of sections in processing in the NC device 1 will be explained. FIG. 11 is a diagram explaining the setting of a plurality of sections in the processing in the NC device 1 illustrated in FIG. 2. The differences in the height of the workpiece appear in such a manner as to continuously change in the machining direction of the workpiece. In contrast, it is difficult for the condition adjusting unit 25 to continuously change the supply rate of the wire 5 owing to the influence of the acceleration and deceleration of the rotary motor 4, the response speed of the rotary motor 4, or the like. Thus, the condition adjusting unit 25 adjusts the supply rate of the wire 5 in each of a plurality of sections into which the workpiece is divided in the direction in which machining is performed.

FIG. 11 illustrates one bead 70 formed on the workpiece. In the example illustrated in FIG. 11, the direction in which machining is performed in formation of the bead 70 is the X-axis direction. The state determining unit 30 divides the workpiece into a plurality of sections in the X-axis direction, and reads estimated disturbance torque in each section from the acquisition unit 29. Each section has a length of Δx in the X-axis direction. The state determining unit 30 determines the contact state in each section on the basis of the estimated disturbance torque read for each section. The condition adjusting unit 25 performs adjustment to lower the supply rate for a section in which the contact state is determined to be the overloaded state by the state determining unit 30. The condition adjusting unit 25 performs adjustment to increase the supply rate for a section in which the contact state is determined to be the non-contact state by the state determining unit 30.

In a manner similar to the state determining unit 30, the error detecting unit 31 reads the estimated disturbance torque in each section from the acquisition unit 29. The error detecting unit 31 detects an error in the height in each section on the basis of the estimated disturbance torque read for each section.

FIG. 12 is a diagram explaining the detection of an error in each section and the adjustment of the supply amount in each section performed by the NC device 1 illustrated in FIG. 2. A bead 71 is a bead to be formed on the bead 70. In formation of the bead 71, the error detecting unit 31 detects an error in each section of the bead 70.

When a time from when the center of the beam cross section reaches a position 73 at which machining in a section 72, which is a section at the end in the negative X direction among the sections of the bead 71, is to be started until the estimated disturbance torque is settled has elapsed, the error detecting unit 31 reads the estimated disturbance torque in the section 72. The error detecting unit 31 obtains an estimate of the height in the section 72 on the basis of the read estimated disturbance torque and the relation illustrated in FIG. 10. The estimate is calculated to be H1. The error detecting unit 31 calculates ΔH, which is a difference between the calculated estimate H1 and the height H1 that is the reference height, to be zero. The additive manufacturing apparatus 100 supplies the wire 5 to the section 72 without adjusting the supply rate set by the condition setting unit 24 on the basis of the detection result indicating that ΔH is zero. In this manner, the additive manufacturing apparatus 100 forms the bead 71 reaching a height H2 by performing machining with the supply amount in accordance with a machining condition in the section 72.

The error detecting unit 31 detects an error in each section other than the section 72 in the same manner as in the section 72. A section 74 illustrated in FIG. 12 is one of the sections including a convex portion of the bead 70. For the section 74, when a time from when the center of the beam cross section reaches a position 75 at which machining in the section 74 is to be started until the estimated disturbance torque is settled has elapsed, the error detecting unit 31 reads the estimated disturbance torque in the section 74. Assume that an estimate of the height in the section 74 is calculated to be H3. ΔH is calculated to be (H3-H1) by the error detecting unit 31. When |H3-H1|, which is the absolute value of ΔH, is larger than Thc described above, the condition adjusting unit 25 performs adjustment to lower the velocity value in the section 74 to a value lower than the supply rate based on the setting at the condition setting unit 24. As a result, the additive manufacturing apparatus 100 performs machining with a supply amount smaller than the supply amount in accordance with a machining condition in the section 74. The additive manufacturing apparatus 100 also forms the bead 71 reaching the height H2 in the section 74 by adjusting the supply amount in this manner to compensate for the error in the height in the section 74. The additive manufacturing apparatus 100 can thus make the height of the workpiece uniform.

The condition adjusting unit 25 performs adjustment to change the supply rate in each section while the center of the beam cross section passes the section. FIG. 13 is a graph explaining the adjustment of the supply rate in sections performed by the NC device 1 illustrated in FIG. 2. The graph of FIG. 13 represents transitions of the supply rate in two sections. The vertical axis of the graph represents the supply rate V of the wire 5, and the horizontal axis thereof represents time t. The velocity value V1 is a velocity value in accordance with a machining condition.

The NC device 1 repeats the detection of an error and the adjustment of the supply rate in each section to make the height of the workpiece uniform. The NC device 1 performs first to fifth processing as follows in the control for making the height uniform.

In the first process, the condition adjusting unit 25 adjusts the supply rate V to the velocity value V1. In the second process, the error detecting unit 31 estimates the height of the workpiece on the basis of the estimated disturbance torque during the supply of the wire 5 at the velocity value V1, and detects an error. In the third process, the condition adjusting unit 25 calculates a supply amount of the wire 5 that can compensate for the detected error. In the fourth process, the condition adjusting unit 25 converts the calculated supply amount into time-series data of the supply rate V. In the fifth process, the supply command generating unit 28 generates a supply command based on the time-series data, and outputs the generated supply command.

In FIG. 13, a time Ta represents the time during which the center of the beam cross section passes the section 74 illustrated in FIG. 12. The time Ta is a time necessary for moving the machining head 10 by Δx at a feeding rate F1 in accordance with a machining condition. Before the start of the time Ta, the supply rate V is adjusted to the velocity value V1 at the start of the time Ta by the first process for estimating the height in the section 74. A time t1 is a time necessary for the estimated disturbance torque to be settled after acceleration of the supply rate to the velocity value V1. During the time t1, the NC device 1 performs the second process to the fourth process.

The error detecting unit 31 detects an error in the height on the basis of the estimated disturbance torque that is settled and when the supply rate V at which the wire 5 is fed is the velocity value V1. In this manner, the error detecting unit 31 can detect an error in a state in which the leading end position of the wire 5 is stable.

During times t2 and t3 after the time t1 within the time Ta, the supply rate V is changed depending on a difference between the supply amount in accordance with the machining condition and the calculated supply amount. In the section 74, because the error is a positive error described above, a supply amount that is smaller than the supply amount in accordance with the machining condition is calculated. The condition adjusting unit 25 decelerates the supply of the wire 5 from the velocity value V1 during the time t2 subsequent to the time t1, and accelerates the supply of the wire 5 during a time t3 subsequent to the time t2. The condition adjusting unit 25 performs adjustment to make the supply amount smaller than that in accordance with the machining condition during the time t2 and the time t3.

During the time t2, the supply rate V is lowered from the velocity value V1 to a velocity value Va. During the time t3, the supply rate V is increased from the velocity value Va to the velocity value V1. During this time t3, the first process for estimating the height in a section adjacent to the section 74 in the positive X direction is performed. The time t2 and the time t3 may have time lengths equal to each other. The condition adjusting unit 25 determines the velocity value Va depending on the calculated supply amount.

When the supply amount while the center of the beam cross section moves by a distance x is represented by W, the following formula (2) is satisfied. The unit of the supply amount W is mm. The unit of the time t1, the time t2, and the time t3 is second. The unit of the velocity value V1 and the velocity value Va is mm/second. The right-hand side of the formula (2) expresses the area of a region between the graph of the supply rate V during the time Ta and the horizontal axis in FIG. 13.

$$W = V1 \times t1 + \{(V1+Va) \times t2\}/2 + \{(V1+Va) \times t3\}/2 \quad (2)$$

As t2=t3 is satisfied, t2 is assigned to t3 in the formula (2), the formula (2) is then transformed, and the following formula (3) is thus obtained. The condition adjusting unit 25 calculates the velocity value Va on the basis of the calculated supply amount W and the formula (3).

$$Va = \{W - V1(t1+t2)\}/t2 \quad (3)$$

A time Tb is a time during which the center of the beam cross section passes a section adjacent to the section 74 illustrated in FIG. 12, and having a length equal to the time Ta. During the time Tb as well, the NC device 1 changes the supply rate V in the same manner as during the time Ta. The condition adjusting unit 25 determines a velocity value Vb during the time Tb depending on the supply amount calculated for the section.

According to the first embodiment, the NC device 1 detects an error in the height of the workpiece on the basis of an estimate of the disturbance torque, and adjusts the supply amount of the wire 5 on the basis of the error. The additive manufacturing apparatus 100 can make the height of the workpiece uniform by adjusting the supply amount by the NC device 1. As a result, the NC device 1 produces an advantageous effect of enabling the additive manufacturing apparatus 100 to perform machining with high machining accuracy.

Note that, in the first embodiment, the beam may be a beam other than a laser beam, and may be an electron beam. The additive manufacturing apparatus 100 may include an electron beam generation source that is a beam source. In a case where the beam is other than a laser beam, the NC device 1 also enables the additive manufacturing apparatus 100 to perform machining with high machining accuracy.

The configurations presented in the above embodiments are examples of the details of the present invention, and can be combined with other known technologies or can be partly omitted or modified without departing from the scope of the present invention.

REFERENCE SIGNS LIST

1 NC device; 2 laser oscillator; 3 fiber cable; 4 rotary motor; 5 wire; 6 wire spool; 7 gas supplying device; 8 piping; 10 machining head; 11 beam nozzle; 12 wire nozzle; 13 gas nozzle; 14 head driving unit; 15 stage; 16 rotational driving unit; 17 base material; 18 deposit; 20 machining program; 21 machining condition table; 22 program analyzing unit; 23 axis command generating unit; 24 condition setting unit; 25 condition adjusting unit; 26 condition command generating unit; 27 output command generating unit; 28 supply command generating unit; 29 acquisition unit; 30 state determining unit; 31 error detecting unit; 32, 34 servo amplifier; 33 oscillation controlling unit; 41 CPU; 42 RAM; 43 ROM; 44 external storage device; 45 input/output interface; 46 bus; 50, 60, 61, 70, 71 bead; 51, 62 convex portion; 52, 63 concave portion; 53 droplet; 72, 74 section; 73, 75 position; 100 additive manufacturing apparatus.

The invention claimed is:
1. A numerical control device for controlling an additive manufacturing apparatus for manufacturing a modeled object by irradiating a material fed by a driving force of a motor with a beam and applying the material being molten to a workpiece, the numerical control device comprising:
an error detector configured to detect an error in height of the workpiece in a height direction in which the material is deposited; and
an adjuster configured to adjust a supply amount of the material on a basis of the error, wherein
the error detector is configured to detect the error by estimating the height of the workpiece on a basis of a contact state of the material with the workpiece.

2. The numerical control device according to claim 1, wherein
the error detector is configured to detect the error in each of a plurality of sections into which the workpiece is divided in a machining direction, and
the adjuster is configured to adjust the supply amount in each of the sections.

3. The numerical control device according to claim 1, wherein the adjuster is configured to compare an absolute value of the error with a threshold, and adjust the supply amount when the absolute value of the error is larger than the threshold.

4. The numerical control device according to claim 1, further comprising:
a state determiner configured to determine a contact state of the material with the workpiece, wherein
the error detector is configured to detect the error when the contact state is determined to enable stable machining by the state determiner.

5. The numerical control device according to claim 1, wherein the error detector is configured to detect the error on a basis of an estimate of disturbance torque that acts on the motor.

6. The numerical control device according to claim 5, wherein the error detector is configured to detect the error on a basis of the estimate when a velocity at which the material is fed is a velocity in accordance with a machining condition.

7. The numerical control device according to claim 5, wherein a threshold for determination of an overloaded state in which the material is in contact with the workpiece with an excessive strength is a first threshold, a threshold for determination of a non-contact state in which the material is not in contact with the workpiece is a second threshold, and the error detector is configured to detect the error when the estimate is smaller than the first threshold and larger than the second threshold.

8. An additive manufacturing apparatus for manufacturing a modeled object by applying a material molten by irradiation with a beam to a workpiece, the additive manufacturing apparatus comprising:
a motor configured to generate a driving force for feeding the material from a supply source of the material;
an error detector configured to detect an error in height of the workpiece in a height direction in which the material is deposited; and
an adjuster configured to adjust a supply amount of the material on a basis of the error, wherein
the error detector is configured to detect the error by estimating the height of the workpiece on a basis of a contact state of the material with the workpiece.

9. A method for controlling an additive manufacturing apparatus by a numerical control device, the additive manufacturing apparatus manufacturing a modeled object by irradiating a material fed by a driving force of a motor with a beam and applying the material being molten to a workpiece, the method comprising:
detecting an error in height of the workpiece in a height direction in which the material is deposited; and
adjusting a supply amount of the material on a basis of the error, wherein
the error is detected by estimation of the height of the workpiece on a basis of a contact state of the material with the workpiece.

10. The additive manufacturing apparatus according to claim 8, wherein
the error detector is configured to detect the error in each of a plurality of sections into which the workpiece is divided in a machining direction, and
the adjuster is configured to adjust the supply amount in each of the sections.

11. The additive manufacturing apparatus according to claim 8, wherein the adjuster is configured to compare an absolute value of the error with a threshold, and adjust the supply amount when the absolute value of the error is larger than the threshold.

12. The additive manufacturing apparatus according to claim 8, further comprising:
a state determiner configured to determine a contact state of the material with the workpiece, wherein
the error detector is configured to detect the error when the contact state is determined to enable stable machining by the state determiner.

13. The additive manufacturing apparatus according to claim 8, wherein the error detector is configured to detect the error on a basis of an estimate of disturbance torque that acts on the motor.

14. The additive manufacturing apparatus according to claim 13, wherein the error detector is configured to detect the error on a basis of the estimate when a velocity at which the material is fed is a velocity in accordance with a machining condition.

15. The additive manufacturing apparatus according to claim 13, wherein a threshold for determination of an overloaded state in which the material is in contact with the workpiece with an excessive strength is a first threshold, a threshold for determination of a non-contact state in which the material is not in contact with the workpiece is a second threshold, and the error detector is configured to detect the error when the estimate is smaller than the first threshold and larger than the second threshold.

* * * * *